Patented May 18, 1954

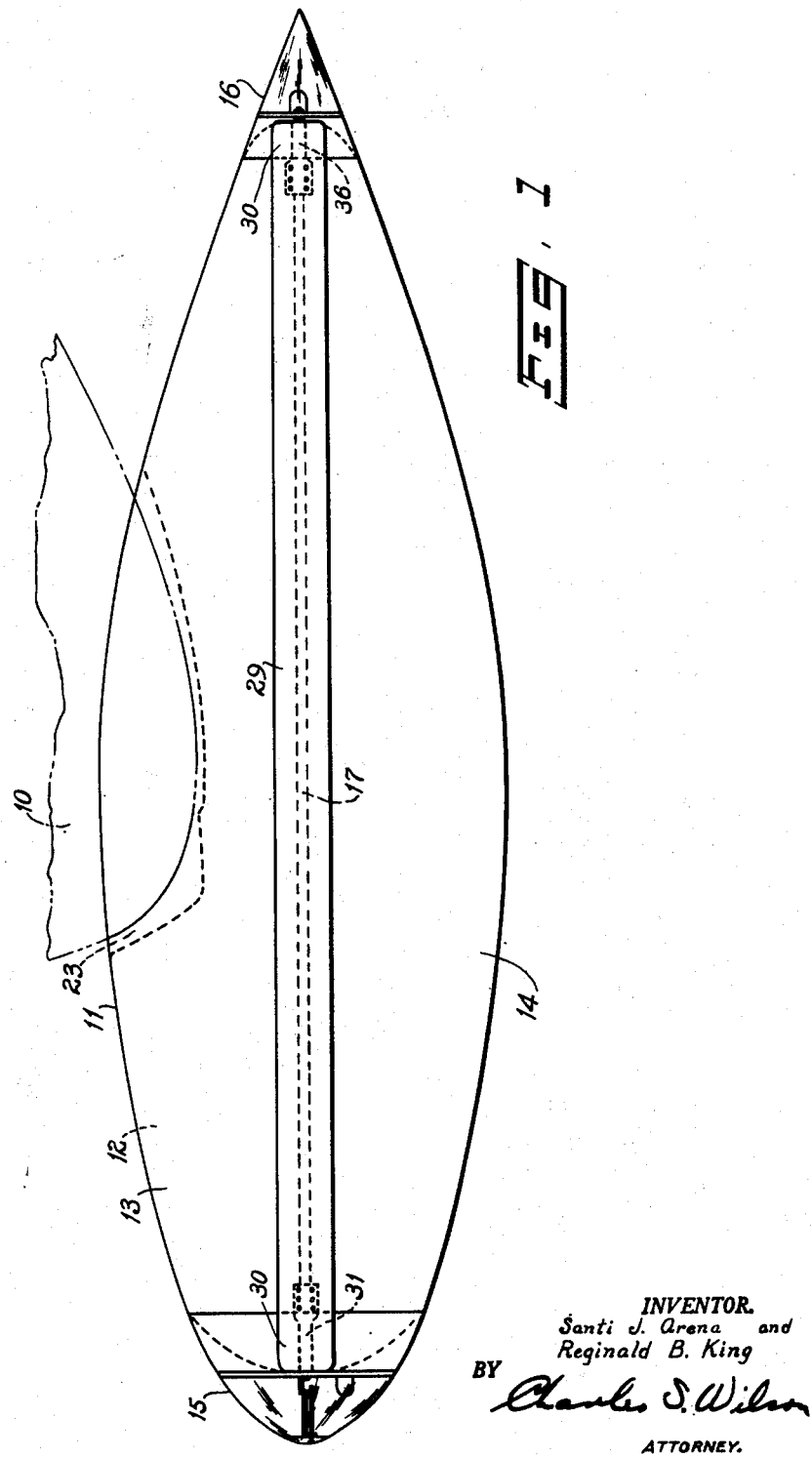

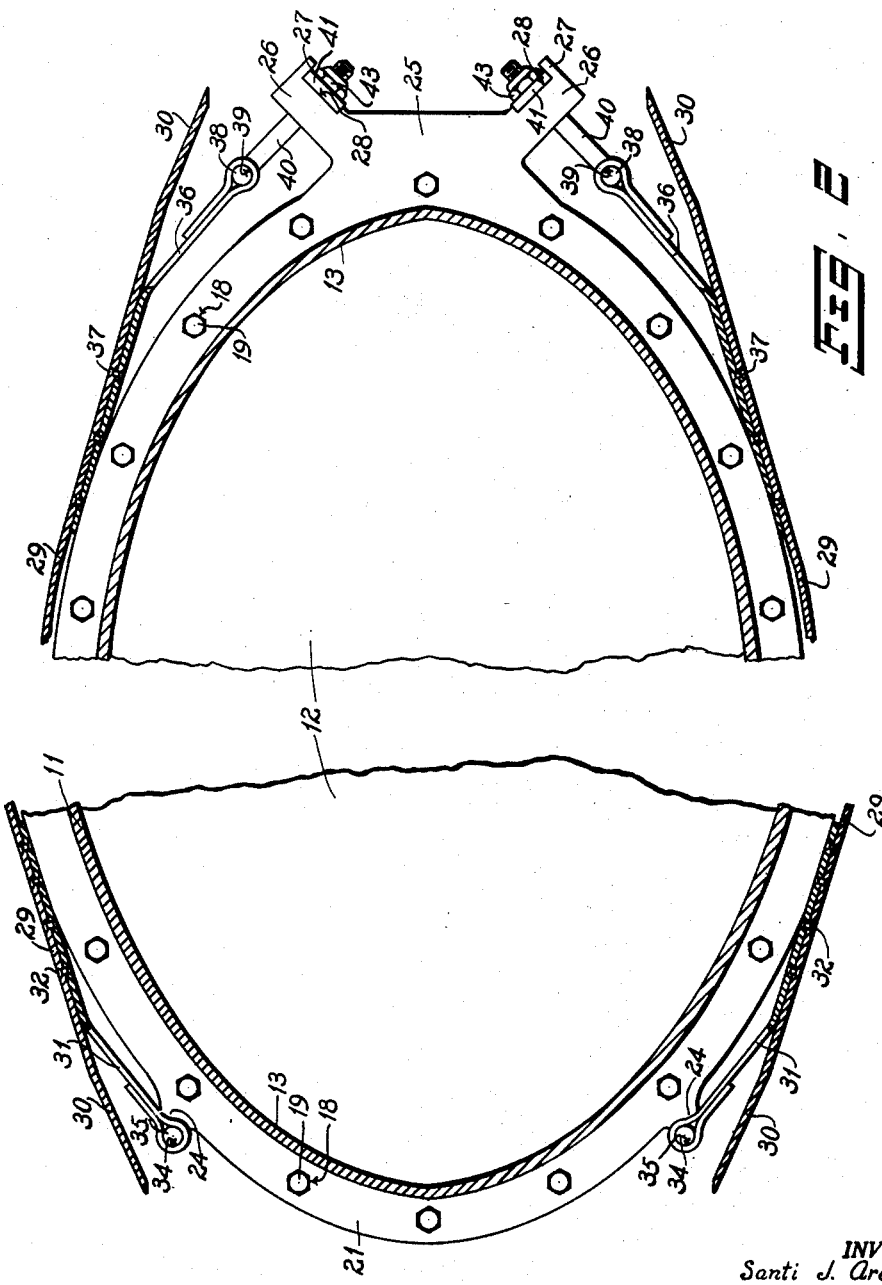

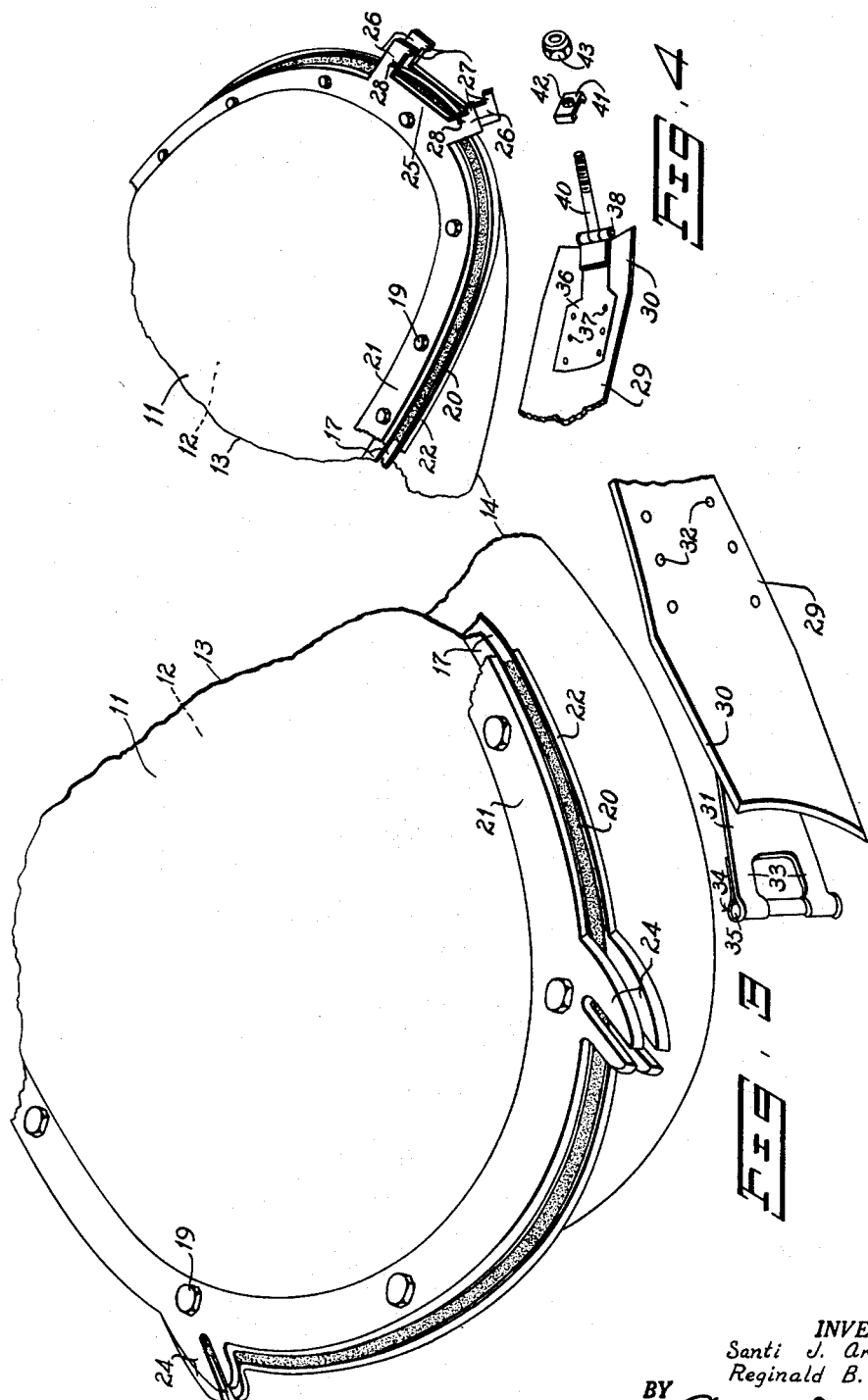

2,679,030

UNITED STATES PATENT OFFICE 2,679,030

FAIRING MOUNTING AND TENSIONING MEANS

Reginald B. King, Douglaston, and Santi J. Arena, East Hempstead, N. Y., assignors to Republic Aviation Corporation, near Farmingdale, N. Y., a corporation of Delaware Application October 18, 1949, Serial No. 121,994

15 Claims. (Cl. 220—5)

This invention relates generally to fairings and is more particularly directed to a mounting means or mechanism for securing and attaching a fairing member in its operative position relative to an associated structure without the use of rivets, buttons, or other devices for that purpose.

Among its other features the present invention contemplates means of mounting and securing a fairing member in its operative position in conjunction with an associated structure and at the same time providing for the regulation of the tension of said member.

Moreover it is proposed to so mount and secure a fairing member that it may be easily and readily attached or removed from the associated structure.

With the above and other objects in view as will become apparent, this invention consists in the construction, combination and arrangement of parts, all as hereinafter more fully described, claimed and illustrated in the accompanying drawings wherein:

Fig. 1 is a fragmentary plan view of the wing tip of an aircraft having a tank in association therewith said tank having a fairing removably mounted thereon in accordance with the present invention;

Fig. 2 is a fragmentary section taken centrally and longitudinally through a tank to illustrate in elevation the mounting and attaching means for a longitudinal fairing in association with the tank;

Fig. 3 is a fragmentary perspective view of one end of the tank and fairing member to show the securing or anchoring means for one end of the fairing member; and Fig. 4 is a similar view of the opposite end of the tank to show the adjustable securing and tensioning means associated with the other end of the fairing member.

Any external projection on an aerodynamic contour reduces the efficiency of the contour by among other things, developing turbulence and drag. This is, to a large extent, also true where there are cavities or openings of any kind in the surface of the contour. Therefore fairing members are used to cover such projections, openings or cavities and are organized and arranged to form smooth and substantially unbroken continuations of the surface of the associated aerodynamic contour. It is with the means of attaching and mounting such fairing members that the subject invention is concerned.

Heretofore, it has usually been the practice to attach a fairing member in its operative position by riveting, buttoning or otherwise permanently attaching the edges thereof to the associated structure or contour. While these customary forms of attachment are satisfactory where the fairing is to be permanently affixed to the structure or contour, there are instances where it is highly desirable to removably secure a fairing in position so as to provide ready access to the underlying structure or to dismantle and assemble a component such as an external tank. One example of where a removable and replaceable fairing may be employed to advantage is disclosed in the copending application of Reginald B. King, Serial No. 106,773, filed July 26, 1949. Here the complemental halves of a tank, designed for external storage on an aircraft, are separably united by outwardly projecting flanges secured in approximately flush surface abutment by bolts. This projecting seam or joint is covered on opposed sides of the tank by fairing members attached only at their extremities to the tank structure in such manner that they may be placed under longitudinal tension to bring their edges into close bearing contact with the tank surface and thereby cause the fairing members to form smooth continuations of the tank surface while spanning the joint or union between the tank halves.

The instant invention can not only be used in conjunction with a removable and replaceable fairing, but may also be employed where the fairing is to be permanently affixed to the associated structure. Under the present practice, i. e., where the edges of the fairing are secured by rivets or buttons, both the fairing and the underlying structure must be pierced by many openings for the reception and passage of the rivets or buttons and care and accuracy must be exercised in this operation to insure absolute registration of these openings in the final assembly of the structure. Moreover, each rivet or button must be individually set or secured in place and treated to bring the exposed surface thereof into the plane of the exposed surface of the fairing. These operations being manual and individual to each rivet or button are time consuming and expensive. As opposed to this, the present invention contemplates a mounting means so constructed and arranged that the fairing member may be readily and securely mounted and at the same time placed under longitudinal tension to bring its edges into intimate and close bearing contact with the associated structure. Thus the need of riveting or buttoning the edges of the fairing member to the associated structure, and the concurrent problems of construction and assembly are eliminated.

In short the subject invention proposes direct and positive attachment only between the ends of a fairing member and the associated structure or tank and by including an adjustment in this attaching means provides for the regulation of the longitudinal tension of the member which brings its edges into bearing and intimate contact with the underlying structure.

The instant invention is described and illustrated herein as applied to a storage tank to be externally associated with an aircraft component to illustrate one adaptation and use thereof. It is to be understood that the subject attaching means can be employed in other places and for other purposes without material change or departing from the spirit and scope hereof. Reference being had more particularly to the drawings, 10 designates the wing tip of an aircraft upon which is mounted a tank assembly or auxiliary container 11. In general, the tank assembly comprises a storage compartment 12 created and defined by the complemental shells or tank halves or sections 13 and 14 combined with a nose or forward section 15 and a tail or aft section 16 that cover and fair the forward and aft end portions respectively of the united sections 13 and 14 of the tank assembly.

The storage or fuel compartment 12 is formed by uniting the shells 13 and 14, each being provided at its edge with an outstanding peripheral flange 17. These flanges 17 are pierced by a series of openings 18 so arranged that the openings of one flange register with the companion openings of the other flange when the shells or tank halves 13 and 14 are united. The flange 17 of the complemental shells 13 and 14 are adapted to be joined or fastened together by bolts 19 projecting through the registered openings 18 provided as aforesaid in the flanges. To prevent leakage at the seam or joint between the shells 13 and 14 and the flanges 17 thereof, a sealing gasket 20 having the same dimensions and contour as the flanges 17 is disposed between the inner surfaces of said flanges and when so placed it is also pierced by the bolts 19 in the final assembly of the tank.

Reinforcing and clamping rings 21 and 22 having substantially the same dimensions and shape as the flanges 17 and the gasket 20 are positioned flush against the outer surfaces of the flanges 17. These reinforcing and clamping rings 21 and 22 each comprise a unitary structure which is coextensive with and rests flush against the outer surface of its adjoining or cooperating flange 17. To secure the rings 21 and 22 in their operative positions in conjunction with the flanges 17, they too are provided with openings which register with the openings 18 in the flanges 17, whereby the bolts 19 may be projected through the rings 21 and 22 as well as the flanges 17 and gasket 20.

In this manner a leakproof joint is established between and at the abutting edges of the complemental shells 13 and 14. Because of the structural strength required of the union between the shells 13 and 14 and to provide ready accessibility to the interior of the fuel compartment a continuous, outstanding projection, consisting of flanges 17, gasket 20, rings 21 and 22 and bolts 19, results from the assembly of the tank. This projection extends completely around the tank in approximate alignment with its longitudinal axis since the tank as a whole is symmetrical relative to this axis. Access may be had to the interior of the tank 12 by removing the bolts 19 and then separating the shells 13 and 14.

In order to provide a housing for the means used to mount the auxiliary tank assembly on the wing tip 10 or on any other component of an aircraft, the inboard shell 13 is provided medially of its length with a cavity or well 23. When the tank is positioned in operative association with an aircraft component, the extremity of the wing tip 10, or in the alternative, the attaching means by which the tank is mounted elsewhere on the aircraft, together with any sway braces and connections for the fuel, pressure and electrical lines are all received and housed within this well 23. Of course the well 23 may be entirely eliminated if desired, and in this event the shells 13 and 14 are duplicates one of the other.

The clamping rings 21 and 22 in addition to reinforcing the flanges 17 of the tank 12 also include means for mounting and anchoring the fairing members which are associated with the projecting seam or joint between the shells 13 and 14 consisting of the gasket 20, flanges 17 and the rings 21 and 22. At one end of the tank each of the rings 21 and 22 is provided with a hook 24 formed integrally therewith and opening inwardly toward each other and toward the central axis of the tank 12. These hooks 24 are arranged in pairs and these pairs are disposed equidistantly upon each side of the longitudinal axis of the tank with the companion hooks of each pair aligned with each other transversely of the rings 21 and 22. By this arrangement a pair of corresponding hooks 24, formed integrally with the rings 21 and 22, are provided on each side of the center of the tank, the use and purpose of which will hereinafter be apparent.

At the opposite end of the tank 12 the rings 21 and 23 are each provided with an extension 25 formed integrally therewith and projecting beyond the limits of the flanges 17 at that point. This extension 25 is relatively wide and is disposed symmetrically relative to the longitudinal axis of the tank and in alignment transversely of said rings with the extension of the companion ring. Each extension has a pair of ears 26 formed integrally thereon to project outwardly from and at an angle to the opposed ends of the extension. A lug 27 is formed to project at right angles to one edge of each ear and in combination with that edge forms a recess and seat 28. The extension 25 and the ears 26 together with the lugs 27, of each ring 21—22 may be said to combine to form a bracket integral or associated with the ring symmetrical to the central axis of the tank 12. Since each of these brackets is aligned transversely of the rings 21 and 22 with the other or corresponding bracket, a pair of superposed and spaced identical brackets are provided the utility and purpose of which will be hereinafter apparent.

The forward and aft sections 15 and 16 of the assembly respectively house and fair the corresponding and adjacent end portions of the tank but those parts of the outstanding joint or union between the shells 13 and 14 extending between the forward and aft sections 15 and 16 are in the absence of fairing members, uncovered and exposed to the air stream and would therefore develop a substantial drag and turbulence. In order to cover or fair each of these exposed portions a longitudinal fairing member 29 is disposed above and completely covers each otherwise exposed part of this joint or union between the shells 13 and 14. This fairing member 29 comprises a relatively narrow strip of spring metal slightly curved or convexed in cross-section and having its end portions 30 bent inwardly toward the longitudinal axis of the tank 12.

This fairing strip 29 is positioned over that portion of the projecting joint formed by the union of the shells 13 and 14 between the forward and aft sections 15 and 16, with its extremities 30 extending beyond and over a portion of the nose and tail sections 15 and 16 respectively. Adjacent one end, and inwardly of the angularly disposed end portion 30, the strip 29 is provided with a front hanger strap 31 riveted, welded, or otherwise secured flush against the inner surface of the strip as at 32. This hanger strap 31 is bifurcated at its free extremity to create the spaced arms 33, which in turn are bent upon themselves and have their terminals welded or otherwise permanently secured to the strap to thereby form the aligned loops 34 in which the ends of an anchoring pin 35 are received and held. The pin 35 of the front hanger strap 31, when the fairing member or strip 29 is in its operative position, is engaged by a pair of the hooks 24 and is thereby anchored and removably held. It is by this arrangement that the forward end of each fairing 29 is removably attached to both of the rings 21 and 22.

The opposite end of each fairing member or strip 29 is provided with a rear hanger strap 36, that is riveted or otherwise, permanently secured, as at 37, to the inner surface of the strip 29 inwardly of the angularly disposed terminal 30 thereof. A bolt 38 is pivotally mounted in a loop 39 formed at the outer extremity of this rear hanger strap 36 and the threaded shank 40 thereof is adapted to be positioned between and project beyond a pair of the spaced ears 26 of the extensions 25. A bearing plate or bridge 41, having a central opening 42 for the free passage of the shank 40 of the bolt 38 is adapted to span the coacting pair of ears 26 in opposition to the rear hanger strap 36 and bear on the edges of said ears inwardly of the lugs 27 which prevent any sliding movement of the bridge along or outwardly of the edges of said ears 26. To hold these elements in their operative positions a nut 43 is threaded on that part of the shank 40 of the bolt 38 which projects beyond the bearing plate or bridge 41. As this nut 43 is threaded inwardly of the shank 40 it contacts and bears against the bridge 41 and draws the shank of the bolt 38 through the bridge and the fairing member or strip, to which the bolt 38 is attached, is thereby placed under adjustable tension. The continued rotation of the nut increases the tension on the fairing member or strip 29 and the edges thereof are thereby brought into close and bearing contact with the exterior surfaces of the shells 13 and 14 on opposite sides of the joint or union between them.

The details of the fore and aft sections 15 and 16 and the cooperation thereof with the angularly disposed ends 30 of the fairing member or strip 29 as well as other features of the tank assembly have not been described or enlarged upon herein beyond that necessary to an understanding of this invention, which as above pointed out, resides essentially in the specific means for mounting a particular fairing strip or member 29 and for placing the same under tension to bring its longitudinal edges into bearing contact with the surfaces of the tank 12 on opposite sides of the projecting joint or union between the sections 13 or 14 thereof. All features of the tank assembly save for the specific mounting and attaching means for the fairing member, are the subject matter of and are described and claimed in the aforesaid application, Serial No. 106,773. From the foregoing it is manifest that the anchoring pin 35 at one end of the fairing member or strip 29 is first engaged in a corresponding pair of hooks 24 at one end of the tank after which the bolt 38 at the opposite end of the fairing member or strip 29 is disposed between a pair of corresponding ears 26 at the opposite end of the tank, whereupon the bearing plate or bridge 41 is positioned over the bolt in bearing contact with the edges of the ears 26 flanking the bolt. When the fairing strip is thus assembled and positioned on the tank the nut 43 is threaded home to place the required longitudinal tension on the fairing strip 29. To remove the fairing member or strip 29 it is only necessary to loosen the nut 43 on the bolt 38 sufficiently to permit the bolt to swing outwardly from between the coacting ears 26, after which the anchoring pin 35 can be removed from its cooperation with the hooks 24.

It is of course apparent that in the event the clamping rings 21—22 are not required or used the hooks 24 and brackets may be formed integrally with the flanges 17 of the tank sections 13 and 14, or in the alternative, the hooks and brackets may be formed as separate components and secured to the flanges 17 somewhat after the manner of attaching the clamping rings 21 and 22 in place. In short, if it is found that the clamping rings 21 and 22 are unnecessary and it is desired to save weight, only that part of the clamping rings embodying the hooks 24 at one end of the tank and the brackets at the opposite end of the tank need be employed.

What is claimed is:

1. The combination with a body having an outstanding projecting member, of means for fairing said member in substantial mergence with the surface of the body comprising, a hook situated at one end of said member, a bracket situated at the opposite end thereof, a strip convexed in section adapted to span and enclose said member between the hook and bracket, a pin carried by that end of the strip adjoining the hook for engagement thereby, a bolt carried by the opposite end of the strip for cooperation with the bracket, and means cooperating with the bolt and the bracket to secure the former to the latter and to place the strip under tension upon the engagement of the pin by the hook.

2. A fairing for a seam projecting from a convex surface comprising a transversely curved strip positioned over the seam with its longitudinal edges parallel to and on opposite sides thereof, a hook at one end of the seam, a bracket at the other end of the seam, and attaching means carried at the ends of the strip for respective cooperation with the hook and bracket, the attaching means cooperating with the bracket embodying a device for placing the strip under longitudinal tension.

3. A fairing for a seam projecting from a convex surface comprising a pair of spaced, parallel hooks at one end of the seam, a pair of spaced, parallel brackets at the opposite end of the seam, a transversely curved strip to overlie the seam with its longitudinal edges substantially parallel to and upon opposite sides thereof, anchoring and attaching means carried by one end of the strip for engagement by said hooks, and attaching means carried by the opposite end of the strip consisting of a bolt to be disposed between said brackets and a nut adjustably mounted on the bolt and adapted to bear on both brackets to place the strip under tension whereby to bring its longitudinal edges into bearing and merging contact with the convex surface aforesaid.

4. The combination with a sectional container having a projecting seam uniting its sections, of a pair of superposed spaced hooks situated at one end of the seam, a pair of superposed spaced brackets situated at the other end of said seam, a fairing member comprising a resilient strip convexed in section to span said seam, a hanger strap attached to one end portion of the strip and carrying a transverse pin for engagement by the hooks aforesaid, a second hanger strap attached to the opposite end of the strip and carrying a tension bolt to be situated between the aforesaid brackets, and a nut adjustable on said tension bolt and adapted to bear against said brackets in opposition to the coacting hanger strap to secure said strip under tension over the seam with its longitudinal edges in bearing and merging contact with the surface of the container on opposite sides of the seam.

5. A fairing means for a projecting, external seam on a convex surface comprising a pair of spaced hooks at one end of said seam, a pair of spaced brackets at the other end of said seam, a strip curved in cross-section disposed over said seam, a hanger strap at each end of the strip having one of its ends attached to the strip, a transverse anchoring pin carried by the free end of one of said hanger straps for engagement by said hooks, a tension bolt carried by the free end of the other of said hanger straps, and means adjustably cooperating with said tension bolt and said brackets to place the strip under tension and to secure it in its operative position relative to the seam.

6. Means for mounting a relatively narrow transversely curved fairing member to an associated structure comprising, a pair of hooks situated at one end of the structure, a pair of brackets situated at the opposite end of said structure, a hanger strap secured to the inner surface of said fairing member adjacent each end thereof, a transverse pin carried by one of said hanger straps for engagement by the hooks aforesaid, a tension bolt carried by the other of said hanger straps for cooperation with the brackets aforesaid, and a nut adjustably mounted on said bolt and adapted to bear against the brackets to regulate the tension on the fairing member.

7. Means for mounting a fairing member on an associated structure comprising a pair of spaced hooks integrally formed with one end of said structure, a pair of spaced brackets integrally formed with the opposed end of said structure, a hanger strap associated with each end of the fairing member, a pin carried by one of said hanger straps for engagement with said hooks, a bolt carried by the other of said hanger straps for engagement with said brackets, and means operative between said bolt and said brackets to place the fairing member under longitudinal tension.

8. Means for mounting a fairing member on an associated structure comprising a pair of spaced open hooks situated adjacent one end of said structure, a pair of spaced brackets situated adjacent the opposite end of said structure, a transverse pin carried by one end of said fairing member for engagement in the hooks aforesaid, a tension bolt carried by the opposed end of said fairing member for positioning between said brackets, a bridge mounted on said bolt and situated to bear against said brackets, and a nut adjustable on said bolt and operable against the bridge to regulate the tension of the fairing member.

9. Means for removably securing a fairing member consisting of a relatively narrow transversely curved strip of spring metal to a projecting seam or joint comprising a pair of hooks situated at one end of the seam, a pair of brackets situated at the opposed end of the seam, a pin carried by one end of the fairing member for engagement with said hooks, a tension bolt carried by the opposite end of the fairing member for cooperation with said brackets, and means coacting with the bolt and the brackets to place the fairing member under tension and thereby removably secure said fairing member over the seam or joint with its longitudinal edges disposed on opposite sides of the seam.

10. Means for removably securing a fairing member consisting of a relatively narrow transversely curved strip of spring metal to and over a projecting structure comprising a pair of spaced superposed hooks fixedly secured to one end of said projecting structure, a pair of superposed spaced brackets fixedly secured to the opposite end of said projecting structure, a hanger strap at each end of the fairing member and having one of its ends permanently attached to said fairing member, a transverse pin carried by the free end of one of said hanger straps for engagement by the hooks, a tension bolt carried by the free end of the other of said hanger straps for cooperation with the brackets, a bridge adapted to span and bear against said brackets and having a central aperture therein for the passage of the shank of the tension bolt, and a nut positioned on said bolt and operable against said bridge in opposition to the hanger strap whereby the fairing member aforesaid may be placed under adjustable tension.

11. The combination with a body having an outstanding projecting member, of means for fairing said member in substantial mergence with the surface of the body comprising, a hook situated at one end portion of said member, a bracket situated at the opposite end portion thereof, a strip convexed in section adapted to span and enclose said member between the hook and bracket, a pin carried by that end of the strip adjoining the hook for engagement thereby, a bolt carried by the opposite end of the strip for cooperation with the bracket, and means associated with said bolt and bracket to place the strip under tension and thereby bring its longitudinal edges in merging and seating contact with the body on opposite sides of the projecting member.

12. The combination with a seam projecting from a convex surface of a fairing comprising a transversely curved strip positioned over the seam with its longitudinal edges parallel to and on opposite sides thereof, a hook at one end of the seam, a bracket at the other end of the seam, and attaching means carried at the ends of the strip for respective cooperation with the hook and bracket, the attaching means cooperating with the bracket embodying a device for placing the strip under longitudinal tension.

13. A fairing comprising a transversely curved strip in combination with mounting and attaching means consisting of a pair of spaced, parallel hooks at one end of the strip, a pair of spaced, parallel brackets at the opposite end of the strip, a transverse pin on one end of the strip for engagement by said hooks, a bolt on the opposite end of the strip to be disposed between said brackets, and a nut adjustably mounted on the bolt and adapted to bear on both brackets to place the strip under tension.

14. The combination with a sectional container having a projecting seam between its sections, of a pair of spaced hooks situated at one end of the seam, a pair of spaced brackets situated at the other end of said seam, a fairing comprising a strip convexed in section and adapted to span said seam, a hanger strap attached to one end portion of the strip and carrying a transverse pin at its outer end for engagement with the hooks aforesaid, a second hanger strap attached to the opposite end of the strip and carrying a tension bolt at its outer end to be situated between the aforesaid brackets, and a nut adjustable on said tension bolt and adapted to bear against said brackets in opposition to the coacting hanger strap to secure said strip under tension over the seam with its longitudinal edges in bearing and merging contact with the surface of the container on opposite sides of the seam.

15. A fairing comprising a strip curved in cross section in combination with mounting means consisting of a pair of spaced hooks adjoining one end of said strip, a pair of spaced brackets adjoining the other end of said strip, a hanger strap at each end of the strip having one of its ends attached to the strip, a transverse pin carried by the free end of one of said hanger straps for engagement by said hooks, a tension bolt carried by the free end of the other of said hanger straps to be disposed between said brackets, and means adjustably cooperating with said tension bolt and said brackets to place the strip under tension in its operative position.

References Cited in the file of this patent

UNITED STATES PATENTS

| Number | Name | Date |
| --- | --- | --- |
| 1,685,926 | Mauran | Oct. 2, 1928 |
| 1,880,355 | Minshall | Oct. 4, 1932 |
| 2,074,523 | Twaits | Mar. 23, 1937 |
| 2,390,761 | Watter | Dec. 11, 1945 |
| 2,433,523 | Mahan et al. | Dec. 30, 1947 |

FOREIGN PATENTS

| Number | Country | Date |
| --- | --- | --- |
| 18,724 | Great Britain | of 1900 |
| 20,349 | Norway | Aug. 1, 1910 |
| 673,040 | France | Sept. 30, 1929 |
| 678,518 | Germany | July 17, 1939 |
| 833,610 | France | July 25, 1938 |